United States Patent [19]  
Harada

[11] Patent Number: 4,844,847  
[45] Date of Patent: Jul. 4, 1989

[54] METHOD AND APPARATUS FOR CONTROLLING INJECTION MOLDING MACHINES

[75] Inventor: Susumu Harada, Numazu, Japan

[73] Assignee: Toshiba Kikai Kabushiki Kaisha, Tokyo, Japan

[21] Appl. No.: 143,621

[22] Filed: Jan. 13, 1988

[30] Foreign Application Priority Data

Jan. 19, 1987 [JP] Japan .................................. 62-9648

[51] Int. Cl.⁴ ............................................. B29C 45/77
[52] U.S. Cl. ................................. 264/40.5; 264/40.7; 425/145
[58] Field of Search .................... 264/40.1, 40.2, 40.5, 264/40.7, 328.1; 425/135, 145, 143, 144, 149, 162, 166

[56] References Cited

U.S. PATENT DOCUMENTS 3,937,776 2/1976 Hold et al. ..................... 264/328.13

FOREIGN PATENT DOCUMENTS 3608973 9/1987 Fed. Rep. of Germany ...... 425/149  
56-162624 12/1981 Japan ................................. 264/40.1  
59-87031 5/1984 Japan ................................. 425/149  
60-247511 12/1985 Japan ................................. 264/40.1  
2105064 3/1983 United Kingdom .

Primary Examiner—Jan H. Silbaugh  
Assistant Examiner—Jill L. Heitbrink  
Attorney, Agent, or Firm—Koda and Androlia

[57] ABSTRACT

In a method of controlling an injection molding machine wherein a pressure holding step is controlled in multiple steps, the transfer points of respective holding pressures are transferred in accordance with the temperature of injected resin or a metal mold detected by a temperature sensor provided for the metal mold.

2 Claims, 2 Drawing Sheets

METHOD AND APPARATUS FOR CONTROLLING INJECTION MOLDING MACHINES

BACKGROUND OF THE INVENTION

This invention relates to a method and apparatus for a multistage pressure control of an injection molding machine during a holding step thereof after filling a molten resin in the mold cavity of the machine, and more particularly a method and apparatus for transferring the pressure transfer points in respective holding steps at points when the resin temperature or the mold temperature reaches a predetermined preset temperature by means of a temperature sensor mounted on the mold.

According to a prior art method of controlling a pressure holding step, the step is time divisioned into multistages and pressures in respective stages are preset so that products having small through large thicknesses can be obtained which are free from shrinkage and have a satisfactory appearance. However, dependent upon the type of resin used, the temperature at which the molten resin solidifies becomes different. Further, the time required for the molten resin to solidify becomes different dependent upon such factors as the volume of the molded product the temperature of the metal mold, so that the operator should have many experiences in order to set desired times and pressures.

Especially, where a high holding pressure is applied to the molten resin while it is solidifying, a large internal stress would be created in the molded product, thus affecting the mechanical strength thereof. In a precise molded product such as a compact disc it is necessary to obtain a molded product having a good appearance, a high transfer printing property and a low stress so that it is impossible to use a high holding pressure. In such product it is necessary to set the holding pressure by taking into consideration not only the operator's experience but also the influences of the external temperature and the resin characteristics.

SUMMARY OF THE INVENTION

It is an object of this invention to provide an improved method and apparatus for a multistage pressure control of an injection molding machine capable of producing high quality products free from shrinkage and internal stress.

According to one aspect of this invention there is provided a method for controlling an injection molding machine wherein a pressure holding step is controlled in multiple stages, characterized by comprising the step of transferring transfer points of respective holding pressures in accordance with the temperature of injected resin or a metal mold detected by a temperature sensor provided for the metal mold.

According to another aspect of this invention there is provided apparatus for controlling an injection molding machine including a metal mold and a screw actuated by an injection cylinder for injecting a molten resin into the metal mold, characterized in that the control apparatus comprises a temperature sensor provided for the metal mold, a temperature setter preset with a plurality of holding pressure transfer point temperatures, a comparator which produces a pressure transfer signal when a temperature detected by the temperature sensor coincides with one of the holding pressure transfer point temperatures, a pressure setter preset with the holding pressure transfer point temperatures, a pressure controller inputted with the pressure transfers signal and an output signal of the pressure setter, and a pressure control valve which controls a pressure of the injection cylinder in accordance with the output signal of the pressure setter when the pressure controller is supplied with the pressure transfer signal.

DESCRIPTION OF THE PREFERRED EMBODIMENT

Figure 1:
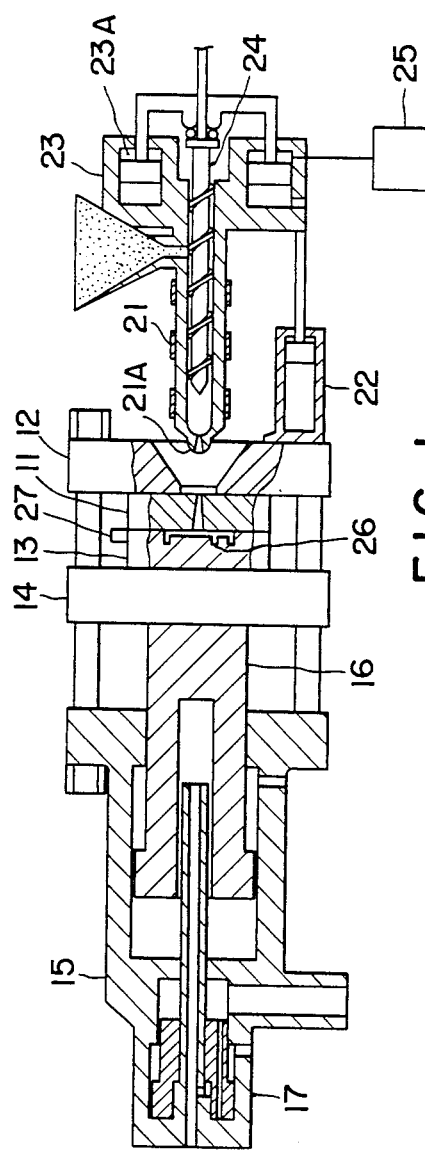
FIG. 1 is a side view, partly in section, showing one embodiment of this invention.

The injection molding machine shown in FIG. 1 comprises a stationary metal mold 11 secured to a stationary plate 12, and a movable metal mold 13 secured to a movable plate 14, the stationary and movable metal molds defining a mold cavity therebetween. The movable plate 14 is connected to the piston 16 of a mold clamping cylinder 15 which is connected to a source of pressurized oil (not shown) through a prefilling valve 17 and a transfer valve, not shown, so that the movable plate 14 is moved toward and away from the stationary plate 12.

To the right of the stationary plate 12 is provided a barrel 21 having heating means, not shown. A screw 24 rotated by a drive source, not shown, and reciprocated by an injection cylinder 23 is contained in the barrel 21, and the barrel is moved toward and away from the stationary plate 12 by a piston-cylinder assembly 22. The righthand chamber 23A of the injection cylinder 23 is connected to a pressure adjusting valve 25 which controls the pressure of the pressurized oil sent from a source of pressurized oil, not shown. A conventional temperature sensor 26 of an infrared ray type, for example, is provided for the movable metal mold for measuring the temperature of the injected resin. In addition an ultrasonic type temperature sensor 27 may be mounted on the surface of metal mold 11 or 13. Although in the foregoing description the temperature of the resin injected into the mold cavity was measured, a temperature sensor can be attached to metal mold 11 or 13 for measuring the temperature of the metal mold.

Figure 2:
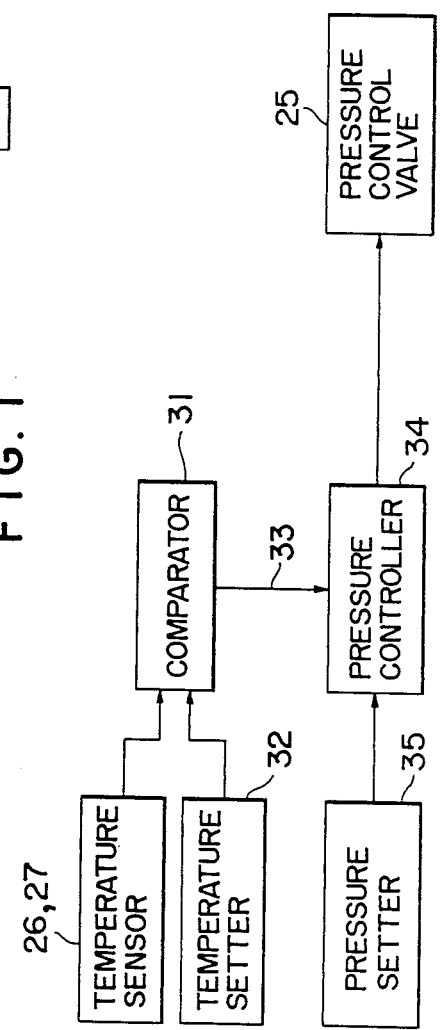
FIG. 2 is a block diagram showing a control unit.

The operation of the injection molding machine shown in FIG. 1 will now be described with reference to FIG. 2. After advancing the barrel 21 by the piston-cylinder assembly 22 to cause a nozzle 21A to urge against the stationary metal plate 11, as the screw 24 is advanced by the injection cylinder 23, the process would enter into a filling step wherein the molten resin in barrel 21 is injected into the mold cavity. During this time, the speed of the screw 24 is being controlled. Upon completion of the filling step, the process enters into the pressure holding step and the control of the screw 24 is transferred from speed control to pressure control.

In the pressure holding step, the temperature sensor 26 or 27 detects the temperature of the injected resin and sends it output signal to a comparator 31 which is also supplied with an output signal of a temperature setter 32 present with a plurality of temperatures at which the transfer between holding pressures is made.

When the temperature from the temperature sensor 26 or 27 coincides with one of the temperatures setted in the temperature setter 32, the comparator 31 sends a pressure trasnfer signal 33 to a pressure controller 34. Since the output signal of a pressure setter 35 is also applied to the pressure controller 34, it wills end the output signal from the pressure setter 35 to a pressure control valve 25 for controlling the injection (holding) pressure of the injection cylinder 23. Although in the foregoing description the temperature of the injected resin was detected, the temperature of the metal mold 11 or 13 can also be detected.

Figure 3:
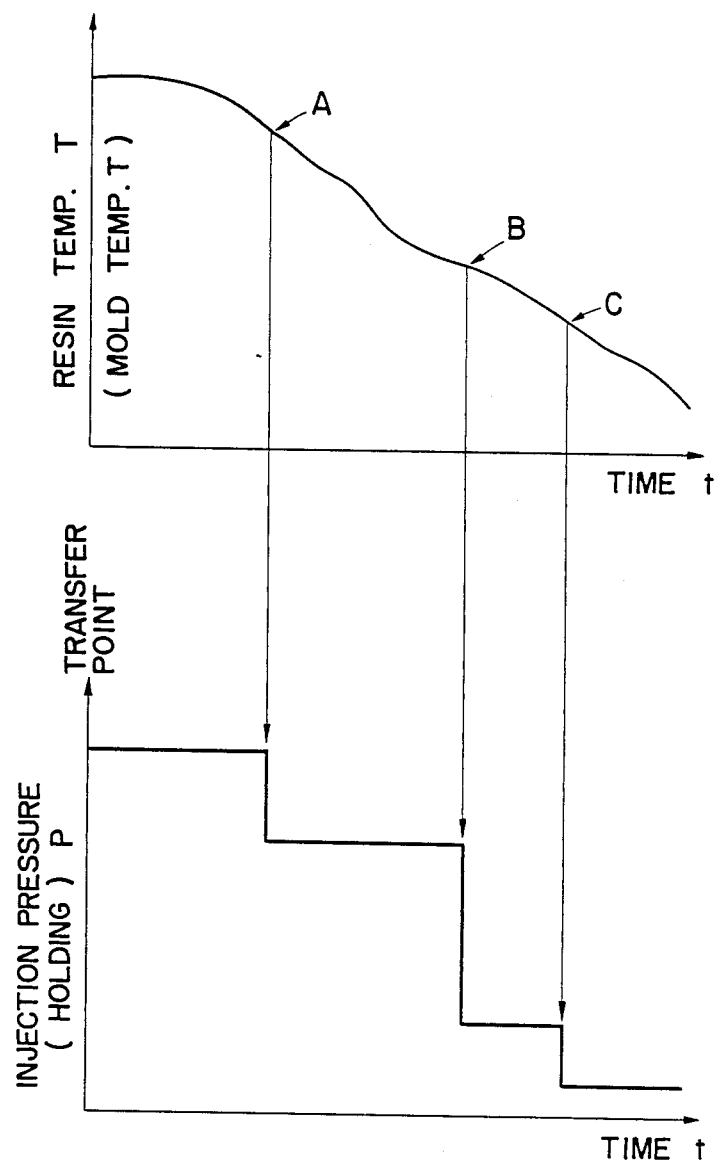
FIG. 3 is a graph showing the relation between the resin temperature and time, and the relation between the injection pressure and time.

FIG. 3 shows graphs showing the relationships between time t (abscissa) and the resin (mold) temperature T (ordinate) and between time t and the injection (holding) pressure P. Points A, B and C along a resin temperature curve respectively represent pressure transfer point temperatures in which point B also represents the solidification temperature of the molten resin. As can be noted from FIG. 3, during the pressure holding step, the injection pressure P is high until point A is reached, but at this point when the temperature sensed by temperature sensor 26 or 27 becomes equal to the transfer point temperature of the temperature setter 32, the injection pressure of the injection cylinder 23 would be decreased by the operation of comparator 31 and pressure controller 34. Then, when the resin temperature reaches the solidification temperature shown by point B, the injection pressure decreases greatly, in an extreme case, to zero. At point C, the injection pressure becomes a small value.

As above described, according to the method and apparatus for controlling an injection molding machine of this invention, during the pressure holding step, the pressure transfer points are made of points at which the resin temperature detected by the temperature sensor attached to the metal mold or the mold temperature reaches preset temperatures so that the pressure propagation is high and the pressure holding effect is also high in a state wherein the resin temperature in the mold cavity is high and hence the fluidity of the resin is also high, thus suppressing adverse factors that affect the quality of the molded product such as shrinkage which means a high injection pressure. In a state wherein the resin temperature decreases and the pressure propagation also decreases, or in a state in which the molten resin solidifies it is possible to prevent internal stress from being created in the product by decreasing the injection pressure.

Furthermore, it is possible to obtain satisfactory products by applying suitable holding pressure because the operation is controlled based on the resin temperature even in such a state wherein the relation between the resin temperature and time is caused to vary due to variations in such external factors as the mold temperature.

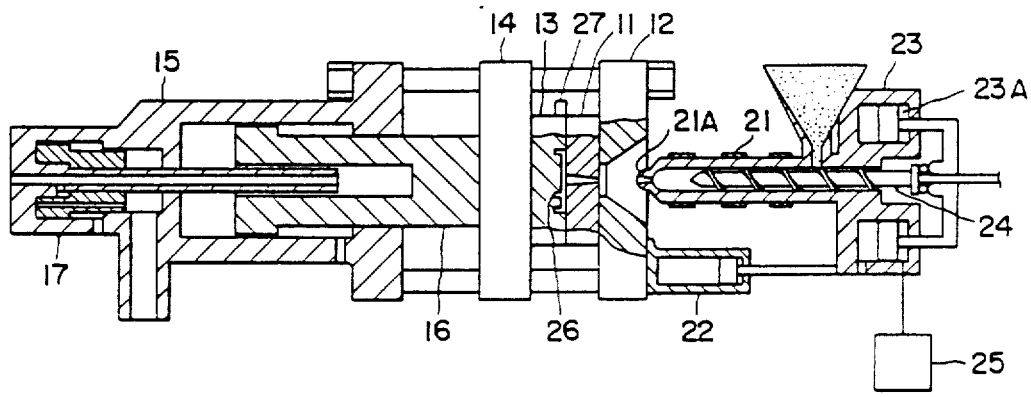

What is claimed is:

1. In a method for controlling an injection molding machine for injecting resin into a metal mold wherein a pressure holding step is controlled in multiple stages by actuating a screw, the improvement comprising the step of switching holding pressures at respective transfer points in accordance with a temperature of said injected resin or said metal mold detected by a temperature sensor provided for said metal mold coinciding with a preset holding pressure transfer point temperature.

2. Apparatus for controlling an injection molding machine including a metal mold and a screw actuated by an injection cylinder for injecting a molten resin into said metal mold, said control apparatus comprising:
   a temperature sensor provided for said metal mold;
   a temperature setter preset with a plurality of holding pressure transfer point temperatures;
   a comparator which produces a pressure transfer signal when a temperature detected by said temperature sensor coincides with one of said holding pressure transfer point temperatures;
   a pressure setter preset with holding pressures corresponding to said pressure transfer point temperatures;
   a pressure controller inputted with said pressure transfer signal and an output signal of said pressure setter; and
   a pressure control valve which controls a pressure of said injection cylinder in accordance with the output signal one of said holding pressures of said pressure setter when said pressure controller is supplied with said pressure transfer signal.

* * * * *

UNITED STATES PATENT AND TRADEMARK OFFICE
CERTIFICATE OF CORRECTION

PATENT NO. : 4,844,847

DATED : July 4, 1989

INVENTOR(S) : Susumu Harada

It is certified that error appears in the above-identified patent and that said Letters Patent is hereby corrected as shown below:

The title page showing the illustrative figure should be deleted and replaced with the title page as shown on the attached page.

Signed and Sealed this

Fifth Day of May, 1992

Attest:

DOUGLAS B. COMER

*Attesting Officer*   Acting Commissioner of Patents and Trademarks

United States Patent [19]

Harada

[11] Patent Number: 4,844,847
[45] Date of Patent: Jul. 4, 1989

[54] METHOD AND APPARATUS FOR CONTROLLING INJECTION MOLDING MACHINES

[75] Inventor: Susumu Harada, Numazu, Japan

[73] Assignee: Toshiba Kikai Kabushiki Kaisha, Tokyo, Japan

[21] Appl. No.: 143,621

[22] Filed: Jan. 13, 1988

[30] Foreign Application Priority Data

Jan. 19, 1987 [JP] Japan ................................ 62-9648

[51] Int. Cl.⁴ ............................................. B29C 45/77
[52] U.S. Cl. ................................. 264/40.5; 264/40.7; 425/145
[58] Field of Search .............. 264/40.1, 40.2, 40.5, 264/40.7, 328.1; 425/135, 145, 143, 144, 149, 162, 166

[56] References Cited

U.S. PATENT DOCUMENTS 3,937,776  2/1976  Hold et al. ................. 264/328.13

FOREIGN PATENT DOCUMENTS 3608973   9/1987  Fed. Rep. of Germany ...... 425/149
56-162624 12/1981  Japan ........................... 264/40.1
59-87031   5/1984  Japan ........................... 425/149
60-247511 12/1985  Japan ........................... 264/40.1
2105064   3/1983  United Kingdom Primary Examiner—Jan H. Silbaugh
Assistant Examiner—Jill L. Heitbrink
Attorney, Agent, or Firm—Koda and Androlia

[57] ABSTRACT

In a method of controlling an injection molding machine wherein a pressure holding step is controlled in multiple steps, the transfer points of respective holding pressures are transferred in accordance with the temperature of injected resin or a metal mold detected by a temperature sensor provided for the metal mold.

2 Claims, 2 Drawing Sheets